United States Patent
Byun et al.

(10) Patent No.: US 9,312,528 B2
(45) Date of Patent: Apr. 12, 2016

(54) RECHARGEABLE BATTERY AND BATTERY MODULE

(75) Inventors: Sang-Won Byun, Yongin-si (KR);
Yong-Sam Kim, Yongin-si (KR);
Soo-Seok Choi, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 562 days.

(21) Appl. No.: 12/898,609

(22) Filed: Oct. 5, 2010

(65) Prior Publication Data

US 2011/0287300 A1 Nov. 24, 2011

(30) Foreign Application Priority Data

May 20, 2010 (KR) .................. 10-2010-0047717

(51) Int. Cl.
*H01M 2/20* (2006.01)
*H01M 2/24* (2006.01)
*H01M 2/22* (2006.01)
*H01M 2/30* (2006.01)
*H01M 2/06* (2006.01)

(52) U.S. Cl.
CPC ............... *H01M 2/202* (2013.01); *H01M 2/06* (2013.01); *H01M 2/20* (2013.01); *H01M 2/22* (2013.01); *H01M 2/24* (2013.01); *H01M 2/30* (2013.01); *H01M 2/307* (2013.01)

(58) Field of Classification Search
CPC ..... H01M 2/202; H01M 2/204; H01M 2/206; H01M 2/208; H01M 2/22; H01M 2/24; H01M 2/307; H01M 2/06; H01M 2/20; H01M 2/30
See application file for complete search history.

(56) References Cited

U.S. PATENT DOCUMENTS

| 6,156,452 | A | * | 12/2000 | Kozuki et al. | 429/211 |
|---|---|---|---|---|---|
| 2001/0049054 | A1 | | 12/2001 | Enomoto et al. | |
| 2002/0106560 | A1 | * | 8/2002 | Kolb et al. | 429/212 |
| 2003/0064285 | A1 | * | 4/2003 | Kawamura et al. | 429/181 |
| 2003/0143460 | A1 | * | 7/2003 | Yoshida et al. | 429/181 |
| 2006/0146475 | A1 | * | 7/2006 | Zhong et al. | 361/301.1 |
| 2008/0176131 | A1 | * | 7/2008 | Byun et al. | 429/122 |
| 2009/0004511 | A1 | * | 1/2009 | Hlavac | 429/3 |
| 2009/0130554 | A1 | * | 5/2009 | Jang et al. | 429/179 |
| 2009/0274956 | A1 | * | 11/2009 | Kosugi et al. | 429/158 |

(Continued)

FOREIGN PATENT DOCUMENTS

| JP | 11-195434 | | 7/1999 | |
|---|---|---|---|---|
| JP | 2002-358945 | * | 12/2002 | ............ H01M 2/20 |

(Continued)

OTHER PUBLICATIONS

Patent Abstracts of Japan and machine English language translation of JP Publication No. 2003-45408 A to Osumi et al., 7 pps.

*Primary Examiner* — Ula C Ruddock
*Assistant Examiner* — Amanda Barrow
(74) *Attorney, Agent, or Firm* — Lewis Roca Rothgerber Christie LLP (57) ABSTRACT

A rechargeable battery including an electrode assembly; a case housing the electrode assembly; a first terminal post electrically coupled to an electrode of the electrode assembly; and a first terminal plate including a first plate coupled to the first terminal post and a second plate coupled to the first plate, wherein the first plate and the second plate are made from different materials.

7 Claims, 7 Drawing Sheets

(56) References Cited

U.S. PATENT DOCUMENTS

| | | | |
|---|---|---|---|
| 2009/0305119 A1* | 12/2009 | Kim | 429/93 |
| 2010/0015519 A1* | 1/2010 | Trester et al. | 429/160 |
| 2010/0062329 A1* | 3/2010 | Muis | 429/158 |
| 2010/0081048 A1* | 4/2010 | Nansaka et al. | 429/158 |
| 2010/0092846 A1* | 4/2010 | Inagaki et al. | 429/92 |
| 2010/0099018 A1* | 4/2010 | Kawase et al. | 429/105 |
| 2010/0104941 A1* | 4/2010 | Nakabayashi | 429/181 |
| 2011/0081572 A1* | 4/2011 | Byun et al. | 429/178 |
| 2011/0104566 A1* | 5/2011 | Byun et al. | 429/211 |
| 2011/0244308 A1* | 10/2011 | Byun | H01M 2/204 429/158 |
| 2011/0244309 A1* | 10/2011 | Byun | H01M 2/043 429/158 |

FOREIGN PATENT DOCUMENTS

| | | | | |
|---|---|---|---|---|
| JP | 2002-358945 A | | 12/2002 | |
| JP | 2003-045408 | * | 2/2003 | H01M 2/30 |
| JP | 2003-45408 A | | 2/2003 | |
| KR | 10-2006-0055308 | | 5/2006 | |
| KR | 10-2007-0108748 | | 11/2007 | |
| WO | PCT/JP2007/069286 | * | 4/2008 | H01M 2/08 |

* cited by examiner

RECHARGEABLE BATTERY AND BATTERY MODULE

RELATED APPLICATIONS

This application claims priority to and the benefit of Korean Patent Application No. 10-2010-0047717 filed in the Korean Intellectual Property Office on May 20, 2010, the entire content of which is incorporated herein by reference.

BACKGROUND

1. Field

The described technology relates generally to a rechargeable battery and a battery module.

2. Description of the Related Art

A rechargeable battery differs from a primary battery in that it can be repeatedly charged and discharged, while the latter makes only the irreversible conversion of chemical to electrical energy. A low-capacity rechargeable battery is used as the power supply for small electronic devices, such as cellular phones, notebook computers and camcorders, while a high-capacity rechargeable battery is used as the power supply for driving motors in hybrid vehicles and the like.

A high-power rechargeable battery using a non-aqueous electrolyte with a high energy density has been recently developed. For example, the high-power rechargeable battery is constructed with a high-capacity rechargeable battery having a plurality of rechargeable cells coupled to each other in series such that it can be used as the power supply for driving motors in electric vehicles requiring high power.

Furthermore, one high-capacity rechargeable battery is commonly formed with a plurality of rechargeable cells coupled to each other in series. The rechargeable battery may have a cylindrical shape, a prismatic shape, etc.

Rechargeable batteries typically include an electrode assembly having a positive electrode, a negative electrode, and a separator therebetween, and an externally protruding terminal. A positive electrode current collector is made of aluminum and a negative electrode current collector is made of copper, and thus a positive electrode terminal electrically connected with the positive electrode is made of aluminum and a negative electrode terminal connected with the negative electrode is made of copper.

The positive electrode current collector and the positive electrode current collector are made from the same material and the negative electrode current collector and the negative electrode are the same material because often different materials cannot be easily bonded to each other by welding and a portion where the different materials are welded is relatively weak in strength.

Furthermore, when the positive electrode and the negative electrode are made of different materials, contact resistance between a connection member and the terminals is increased when the connection member is bonded to the terminals by welding, and the welding portion is weak to vibration due to low strength.

The above information disclosed in this Background section is only for enhancement of understanding of the background of the described technology and therefore it may contain information that does not form the prior art that is already known in this country to a person of ordinary skill in the art.

SUMMARY

The described technology provides a rechargeable battery and a battery module that can stably connect a connection member and terminals while reducing contact resistance between an electrode assembly and the terminals.

A rechargeable battery according to an exemplary embodiment of the present invention includes an electrode assembly; a case housing the electrode assembly; a first terminal post electrically coupled to an electrode of the electrode assembly; and a first terminal plate including a first plate coupled to the first terminal post and a second plate coupled to the first plate, wherein the first plate and the second plate are made from different materials.

In one embodiment the first plate and the first terminal post are made from the same material and the first plate and the second plate are friction-welded to each other. The first plate may have an opening through which the first terminal post protrudes and the first terminal post may have a support protruding outwardly from one end of the first terminal post. Further, the support and the second plate can be welded together.

Additionally, the rechargeable battery may include a second terminal post electrically connected to another electrode of the electrode assembly and protruding from the case, and a second terminal plate welded to the second terminal post, wherein the second terminal post, the second terminal plate and the second plate are made from the same material. Further, a third plate including the same material as the first plate is friction-welded to a side of the first plate.

In one embodiment, the first terminal plate is electrically coupled to a negative electrode of the electrode assembly, wherein the first plate is made from copper, and wherein the second plate and the third plate are made from aluminum. Further, a metal flow may be at a region adjacent to a bonding interface of the first and second plates.

In another embodiment, a rechargeable battery includes an electrode assembly; a case housing the electrode assembly; and a first terminal plate including a first plate electrically coupled to the electrode assembly and a second plate made from a different material from the first plate, wherein an edge of the first plate and an edge of the second plate are friction-welded.

Further, in another embodiment, a battery module includes a plurality of rechargeable batteries, each of the rechargeable batteries including an electrode assembly; a first terminal post electrically coupled to a first electrode of the electrode assembly; a first terminal plate having a first plate coupled to the first terminal post and a second plate coupled to the first plate and being made from a different material from the first plate; a second terminal post electrically coupled to a second electrode of the electrode assembly; and a second terminal plate coupled to the second terminal post; and a connection member electrically coupling adjacent ones of the rechargeable batteries together, wherein the connection member is bonded to the second plate of a first rechargeable battery of the rechargeable batteries and to the second terminal plate of a second rechargeable battery of the rechargeable batteries.

In yet another embodiment, a battery module includes a plurality of rechargeable batteries, each of the rechargeable batteries comprising an electrode assembly, a first terminal plate comprising a first plate electrically coupled to the electrode assembly and a second plate friction-welded to the first plate and being made from a different material from the first plate, and a second terminal plate electrically coupled to the electrode assembly; and a connection member electrically coupling the rechargeable batteries, wherein the connection member is coupled to the second plate of a first battery of the rechargeable batteries and the second terminal plate of a second battery of the rechargeable batteries adjacent to the first battery.

According to the exemplary embodiments of the present invention, the terminal plates are made of different materials so that contact resistance not only between the electrode assembly and the terminal plate and but also between the connection member and the terminal plate can be reduced.

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Like reference numerals designate like elements throughout the specification and drawings.

Figure 1:
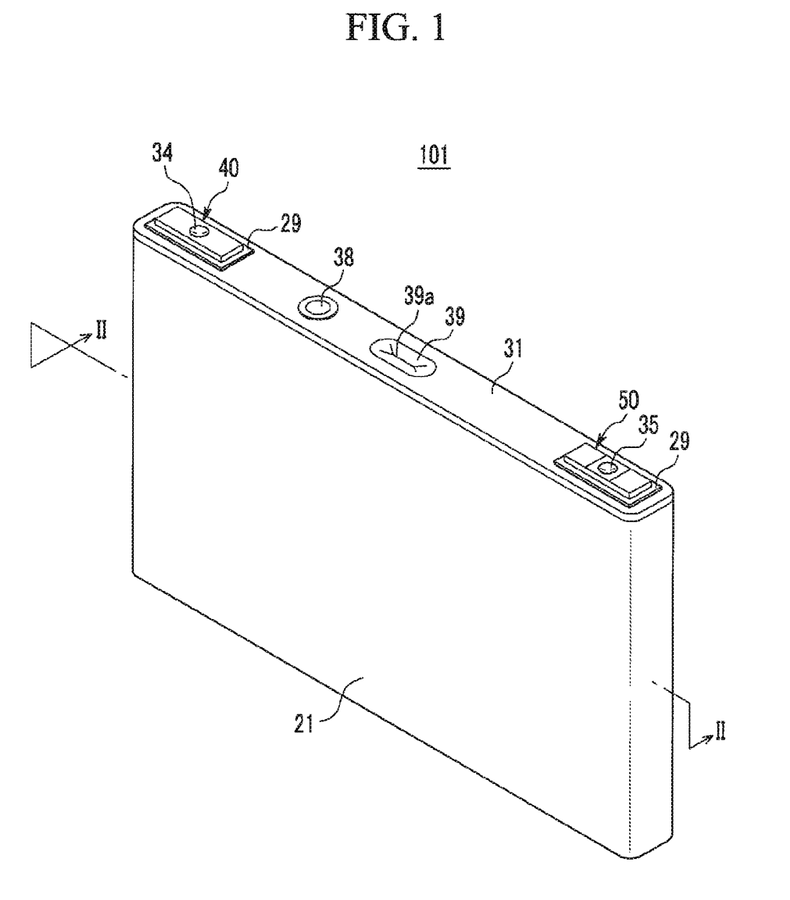
FIG. 1 is a perspective view of a rechargeable battery according to a first exemplary embodiment of the present invention.
Figure 2:
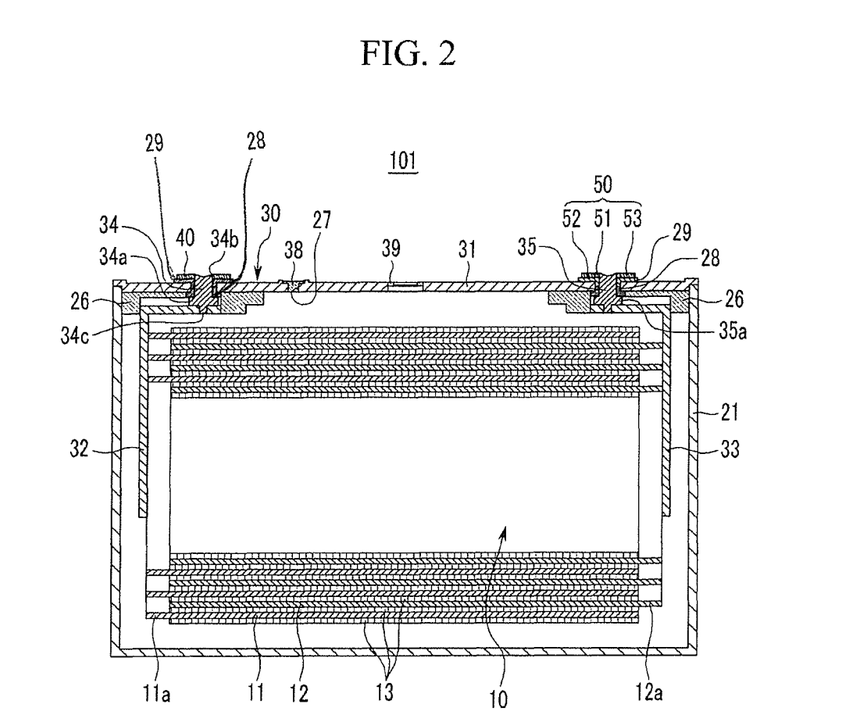
FIG. 2 is a cross-sectional view of FIG. 1, taken along the line II-II.

FIG. 1 is a perspective view of a rechargeable battery according to a first exemplary embodiment of the present invention and FIG. 2 is a cross-sectional view of FIG. 1, taken along the line II-II.

Referring to FIG. 1 and FIG. 2, a rechargeable battery 101 according to the first exemplary embodiment includes an electrode assembly 10 formed by winding a positive electrode 11 and a negative electrode 12 and a separator 13 therebetween, a case 21 in which the electrode assembly 10 is housed, and a cap assembly 30 coupled to an opening of the case 21.

In the first exemplary embodiment, the rechargeable battery 101 is exemplarily described as a lithium ion rechargeable battery with a quadrangular shape However, without being limited thereto, embodiments of the present invention may be applicable to various types of batteries such as a lithium polymer battery, a cylindrical battery, and the like.

The positive electrode 11 and the negative electrode 12 include coated regions, i.e., regions formed by coating an active material on a current collector formed as a thin metal foil, and uncoated regions 11a and 12a of the current collector where the active material is not coated.

The positive electrode uncoated region 11a is formed at one side end of the positive electrode along a length direction thereof, and the negative electrode uncoated region 12a is formed at the other side end of the negative electrode 12 along a length direction thereof. The positive and negative electrodes 11 and 12 are wound after placing an insulating separator 13 therebetween.

However, the present invention is not meant to be limited thereto, and the electrode assembly 10 may have a structure in which positive and negative electrodes are each made up of a plurality of sheets stacked with a separator located therebetween.

The case 21 has a substantially cubic shape, and an opening is formed at one side thereof. The cap assembly 30 includes a cap plate 31 coupled to the opening of the case 21, a positive electrode terminal plate 40 protruding to the outside of the cap plate 31 and electrically connected with the positive electrode 11, a negative electrode terminal plate 50 protruding to the outside of the cap plate 31 and electrically connected with the negative electrode 12, and a vent member 39 having a notch 39a configured to be fractured according to a predetermined internal pressure.

In the present exemplary embodiment, the negative electrode terminal plate 50 acts as a first terminal plate and the positive electrode terminal plate 40 acts as a second terminal plate.

The cap plate 31 is formed as a relatively thin plate, and includes an electrolyte solution inlet 27 formed at one side for insertion of electrolyte solution and a sealing cap 38 for sealing the electrolyte solution inlet 27 fixed to the cap plate 31.

A lower portion of a positive electrode current collecting tap 32 is welded to the positive electrode uncoated region 11a and an upper portion thereof is welded to the positive electrode terminal post 34. A flange 34a contacting the positive electrode current collecting tap 32 is formed at one end of the positive electrode terminal post 34, and a support 34b inserted to the positive electrode terminal plate 40 is formed at the other end thereof. In addition, a protrusion 34c inserted into the positive electrode current collecting tab 32 and welded thereto is formed under the flange 34a.

The positive electrode terminal post 34 is pressed at upper and lower ends thereof while being inserted to the cap plate 31 and into the positive electrode terminal plate 40 to be fixed to the cap plate 31 and the positive electrode terminal plate 40. In this case, the support 34b expanded to the outside by pressure is formed at the upper portion of the positive electrode terminal post 34, and thus the support 34b protrudes from the external circumference of the positive electrode terminal post 34 to prevent the positive electrode terminal post 34 from moving downward toward the electrode assembly.

The positive electrode terminal post 34 and the positive electrode terminal plate 40 are electrically connected to each other by welding the support 34b and the positive electrode terminal plate 40. Here, the positive electrode current collecting tap 32, the positive electrode terminal post 34, and the positive electrode terminal plate 40 are formed from aluminum, and thus the positive electrode terminal post 34 and the positive electrode terminal plate 40 formed from the same material can be easily welded.

A first gasket 28 is provided between the positive electrode terminal post 34 and the cap plate 31 for insulation therebetween, and a second gasket 29 is provided between the positive electrode terminal plate 40 and the cap plate 31 for insulation therebetween.

Figure 3:
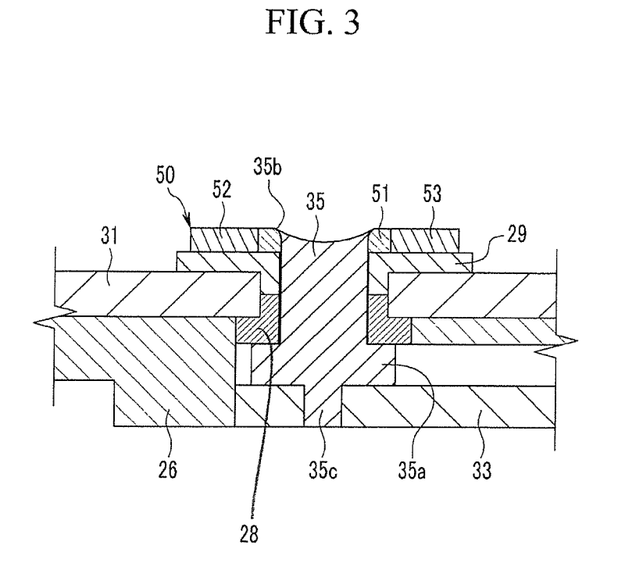
FIG. 3 is a cross-sectional view of a negative electrode terminal plate and a negative electrode terminal post according to the first exemplary embodiment of the present invention.

FIG. 3 is a partial cross-sectional view of the negative electrode terminal plate and the negative electrode terminal post according to the first exemplary embodiment of the present invention.

Referring to FIG. 2 and FIG. 3, a lower portion of the negative electrode current collecting tab 33 is welded to the negative electrode uncoated region 12a and an upper portion thereof is welded to the negative electrode terminal post 35 such that the current collecting tab 33 and the negative electrode terminal post 35 are electrically connected. A flange 35a contacting the negative electrode current collecting tab 33 is formed at one end of the negative electrode terminal post 35 and a support 35b inserted to the negative electrode terminal plate 50 is formed at the other end thereof. In addition, a protrusion 35c inserted to the negative electrode current collecting tab 33 and welded thereto is formed under the flange 35a.

The negative electrode terminal post 35 is fixed to the cap plate 31 and the negative electrode terminal plate 50 by pressure applied to upper and lower ends thereof while the negative electrode terminal post 35 is inserted into the cap plate 31 and the negative electrode terminal plate 50. In this case, a support 35b formed at an upper portion of the negative electrode terminal post 35 is expanded to the outside by pressure, and thus the support 35b protrudes from the external circumference of the negative electrode terminal post 35 to prevent the negative electrode terminal post 35 from moving downward toward the electrode assembly.

For insulation, a first gasket 28 is formed between negative electrode terminal post 35 and the cap plate 31 and a second gasket 29 is formed between the negative electrode terminal plate 50 and the cap plate 31.

While being inserted into the cap plate 31 and the negative electrode terminal plate 50, the negative electrode terminal post 35 is fixed to the cap plate 31 and the negative electrode terminal plate 50 by pressure applied to upper and lower ends thereof. In this case, a support 35b formed at an upper portion of the negative electrode terminal post 35 is expanded to the outside by pressure, and thus the support 35b protrudes from the external circumference of the negative electrode terminal post 35 to prevent the negative electrode terminal post 35 from moving significantly downward. The negative electrode current collecting tab 33 and the negative electrode terminal post 35 are formed from copper.

Figure 4:
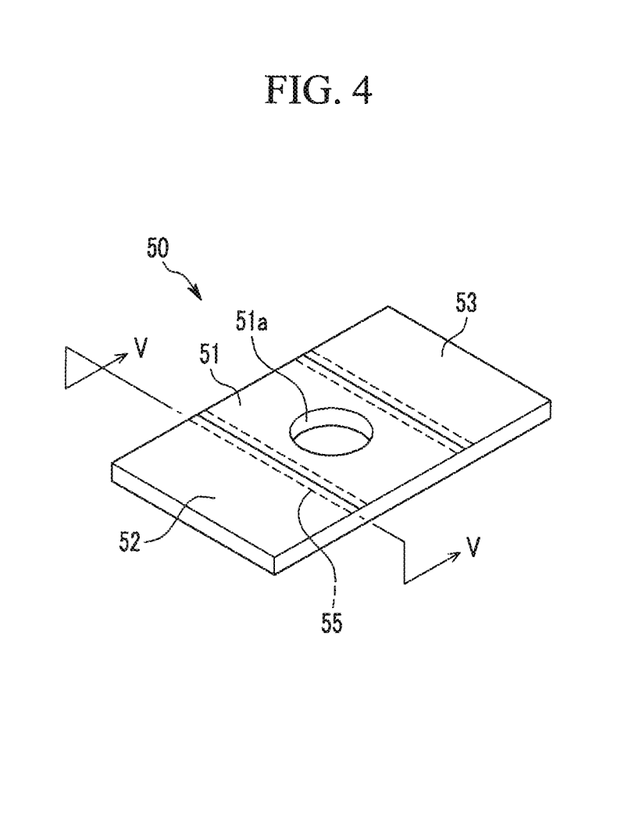
FIG. 4 is a perspective view of the negative electrode terminal plate according to the first exemplary embodiment of the present invention.

As shown in FIG. 4, the negative electrode terminal plate 50 includes a first plate 51 contacting the negative electrode terminal post 35, a second plate 52, and a third plate 53. The second and third plates 52 and 53 are each bonded to one side of the first plate 51. The first plate 51 is located between the second plate 52 and the third plate 53, and side surfaces of the second plate 52 and the third plate 53 are each bonded to a separate side surface of the first plate 51. As described, when the second and third plates 52 and 53 are bonded to the side surfaces of the first plate 51 by welding, the first, second, and third plates 51, 52, and 53 are externally exposed to the case 21 so that a connection member that electrically connects rechargeable batteries 101 can be bonded to the second and third plates 52 and 53.

The first plate 51, the second plate 52, and the third plate 53 are arranged Linearly on substantially the same plane, and the first plate 51, the second plate 52, and the third plate 53 are located on the second gasket 29. A hole 51a is formed in the first plate 51 and the negative electrode terminal post 35 is inserted to the hole 51a. The negative electrode terminal post 35 is pressed while being inserted to the hole 51a and then the externally expanded support 35b is fixed to the first plate 51 by welding. In this case, the first plate 51 and the negative electrode terminal post 35 are formed of the same material, and accordingly, the second plate 52 and the negative electrode terminalpost 35 can be easily bonded for example, by laser welding.

As in the present exemplary embodiment, when the negative electrode terminal post 35 is pressed to the first plate 51 and then laser welded thereto, the negative electrode terminal post 35 and the negative electrode terminal plate 50 can be further stably fixed. When the electrode assembly 10 is moved by external impact or vibration, a relatively high stress is transmitted to the negative electrode terminal post 35 and a relatively low stress is transmitted to the negative electrode terminal plate 50. The negative electrode terminal post 35 of the present exemplary embodiment is formed in a cylindrical shape so that it can endure relatively high stress, and the negative electrode terminal post 35 can be stably coupled with the negative electrode terminal plate 50 by the support 35b formed in the negative electrode terminal post 35. In addition, the negative electrode terminal post 35 and the negative electrode terminal plate 50 are formed from the same material so that they can be easily welded by laser and the like.

The second plate 52 and the third plate 53 are formed from the same material, and the first plate 51 is formed with a material that is different from a material of the second and third plates 52 and 53. The first plate 51 and the negative electrode terminal post 35 are formed from the same material. In the present exemplary embodiment, the first plate 51 and the negative electrode terminal post 35 are made of copper and the second plate 52 and the third plate 53 are made of aluminum.

It is relatively difficult to bond the first plate 51 to the second and third plates 52 and 53 by welding because the first plate 51 and the second and third plates 52 and 53 different in material. Thus, according to the present exemplary embodiment, the aluminum bars are friction-welded to the end of the copper bar by rotating the aluminum bars and then the bonded bars are pressed by a roller to deform the bar into a plate shape.

The friction-welding generates friction heat by rotation of the base and welds the base by pressing with strong pressure and the welding is performed below a melting point of the base so that metals made of different materials can be stably bonded. However, the base to which the friction-welding can be performed has a limit in shape, and thus the shape of the base may be deformed after friction-welding performed according to the present exemplary embodiment.

Figure 5:
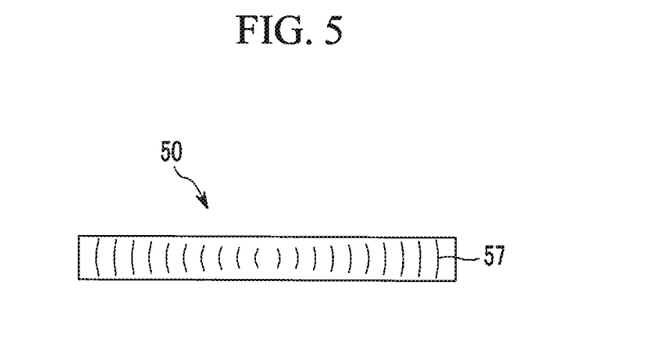
FIG. 5 is a cross-sectional view of FIG. 4, taken along the line V-V.

When the friction-welding is performed, the different materials are strongly bonded to each other at the bonding interface, but metal flow 57 may be formed in a circumferential direction by mechanical torque and heat. The metal flow 57 is pressed during a roller pressure process, and accordingly, the metal flow 57 in an arch shape is formed along a thickness direction of the first plate 51 in the region 55 adjacent to the bonding interface. The metal flow 57 is formed in the solid state bonding, and when the metal flow 57 is formed in the region 55 adjacent to the adjacent interface, the strength of the welded portion is very high compared to the case of being melted.

Figure 6:
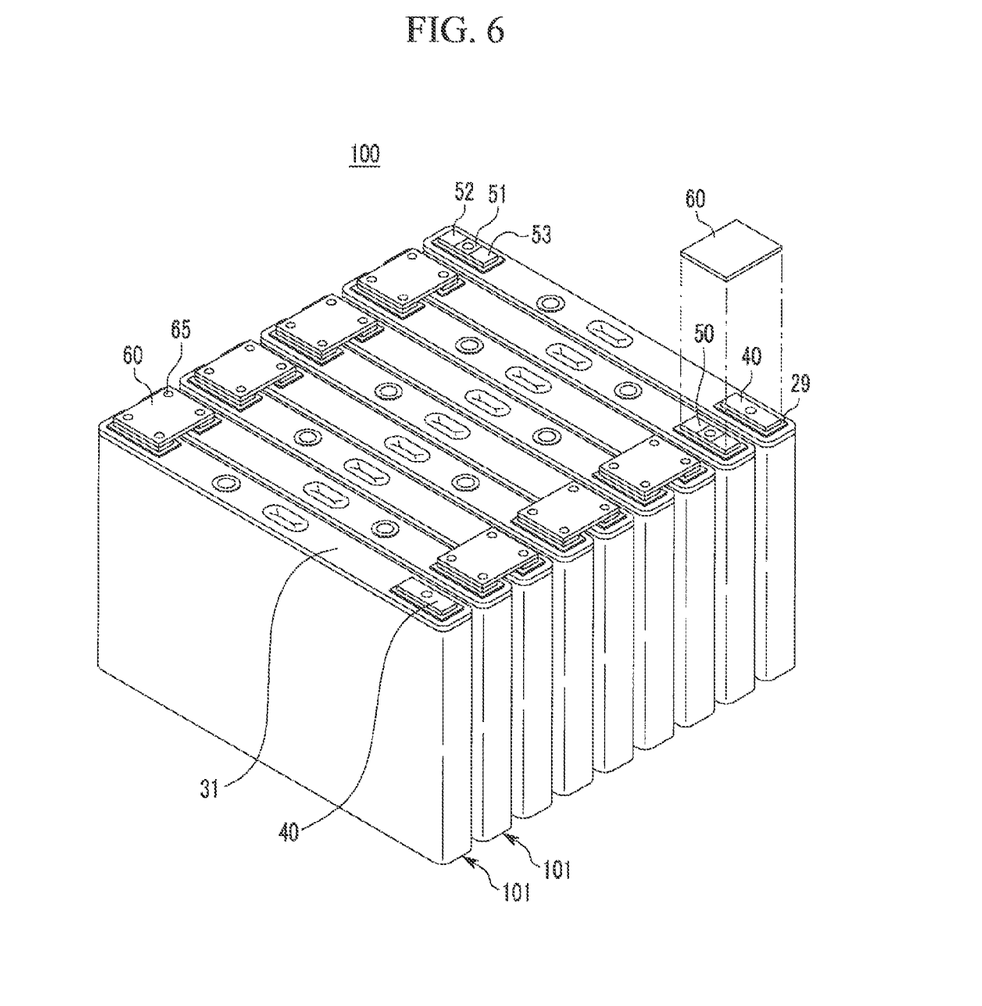
FIG. 6 is a perspective view of a battery module according to the first exemplary embodiment of the present invention.

FIG. 6 is a perspective view of a battery module according to the first exemplary embodiment of the present invention.

Referring to FIG. 6, a battery module 100 includes a plurality of rechargeable batteries 101 and a connection member electrically connecting the plurality of rechargeable batteries.

The plurality of rechargeable batteries 101 arranged in parallel are coupled in series by a connection member 60. Positive electrode terminal plates 40 and negative electrode terminal plates 50 of neighboring rechargeable batteries 101 are arranged in an alternating manner, and in this arrangement, the connection member 60 is bonded to a positive electrode terminal plate 40 of one rechargeable battery 101 and a negative electrode terminal plate 50 of the neighboring rechargeable battery 101 by welding.

The connection member 60 has a plate shape, and is bonded on the positive electrode terminal plate 40 and the negative electrode terminal plate 50 by welding to cover them, and terminal welding portions 65 bonded with the terminal plates 40 and 50 are formed in the connection member 60.

The connection member 60 is formed from a material that is the same as the material of the positive electrode terminal plate 40 and the material of the second and third plates 52 and 53. The connection member 60, the positive electrode terminal plate 40, the second plate 52, and the third plate 53 are made of aluminum, and the connection member 60 is bonded to the second and third plates 52 and 53 by welding in the negative electrode terminal plate 50.

In addition, since the connection member 60 is bonded to the second and third plates 52 and 53 formed on edges of the negative electrode terminal plate 50 by welding, the connection member 60 can be further stably fixed to the negative electrode terminal plate 50 so that contact failure between the negative electrode terminal plate 50 and the connection member 60 due to external impact or vibration can be prevented. That is, if rotation torque is applied to the connection member 60, the rotation torque can be stably supported by large gaps formed between the terminal welding portions 65.

As described, according to the present exemplary embodiment, the negative electrode terminal plate 50 welded with the connection member 60 is formed with the same material as of the connection member 60 so that contact resistance between the connection member 60 and the negative electrode terminal plate 50 can be minimized.

Figure 7:
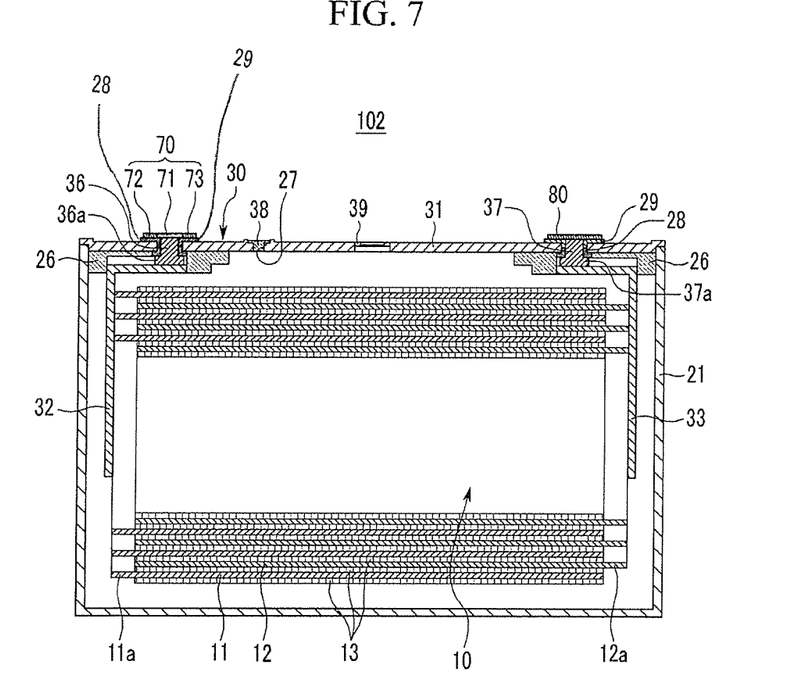
FIG. 7 is a cross-sectional view of a rechargeable battery according to a second exemplary embodiment of the present invention.

FIG. 7 is a cross-sectional view of a rechargeable battery according to a second exemplary embodiment of the present invention.

Referring to FIG. 7, a rechargeable battery 102 according to the present exemplary embodiment is the same in structure as the rechargeable battery of the first exemplary embodiment, excluding terminal plates 70 and 80 and terminal posts 36 and 37. Therefore, descriptions of the same structure will be omitted.

The rechargeable battery 102 according to the present exemplary embodiment includes a positive electrode terminal post 36 electrically connected with a positive electrode current collecting tap 32 and a negative electrode terminal post 37 electrically connected with a negative electrode current collecting tab 33.

A positive electrode terminal plate 70 is bonded to the positive electrode terminal post 36 by welding, and the positive electrode terminal plate 70 is located on a cap plate 31. The positive electrode terminal plate 70 includes a first plate 71, a second plate 72 bonded to one side of the first plate 71, and a third plate 73 bonded the other side of the first plate 71.

The first plate 71, the second plate 72, and the third plate 73 are arranged in a line on the same plate, and thus the first plate 71, the second plate 72, and the third plate 73 are located on a second gasket 29. A flange 36a is formed at the lower end of the positive electrode terminal post 36, and the upper end of the positive electrode terminal post 36 is welded to the lower end of the first plate 71. In this case, the first plate 71 and the positive electrode terminal post 36 are made of the same material, and accordingly the first plate 71 and the positive electrode terminal post 36 can be easily bonded to each other by resistance-welding and the like.

The second plate 72 and the third plate 73 are made of the same material, and the material of the first plate 71 is different from the material of the second and third plates 72 and 73. In the present exemplary embodiment, the first plate 71 and the positive electrode terminal post 36 are made of aluminum and the second plate 72 and the third plate 73 are made of copper. The first plate 71 is bonded to the second plate 72 and the third plate 73 by friction-welding.

A negative electrode terminal plate 80 is bonded to an upper portion of a negative electrode terminal post 37 by welding and a flange 37a is formed in a lower portion of the negative electrode terminal post 37. The negative electrode terminal post 37 is bonded to a bottom surface of the negative electrode terminal plate 80 by welding.

The negative electrode terminal plate 80 is formed as a single plate, and the negative electrode terminal plate 80, the negative electrode terminal post 37, and negative electrode current collecting tab 33 are made of the same material, that is, copper. Accordingly, the negative electrode terminal plate 80, the negative electrode terminal post 37, and the negative electrode current collecting tab 33 can be easily welded.

As in the present exemplary embodiment, when the second and third plates 72 and 73 made of the same material as of the negative electrode terminal plate 80 are formed in the positive electrode terminal plate 70, positive electrode terminal plates 70 and negative electrode terminal plates 80 of neighboring rechargeable batteries 102 can be easily coupled.

Figure 8:
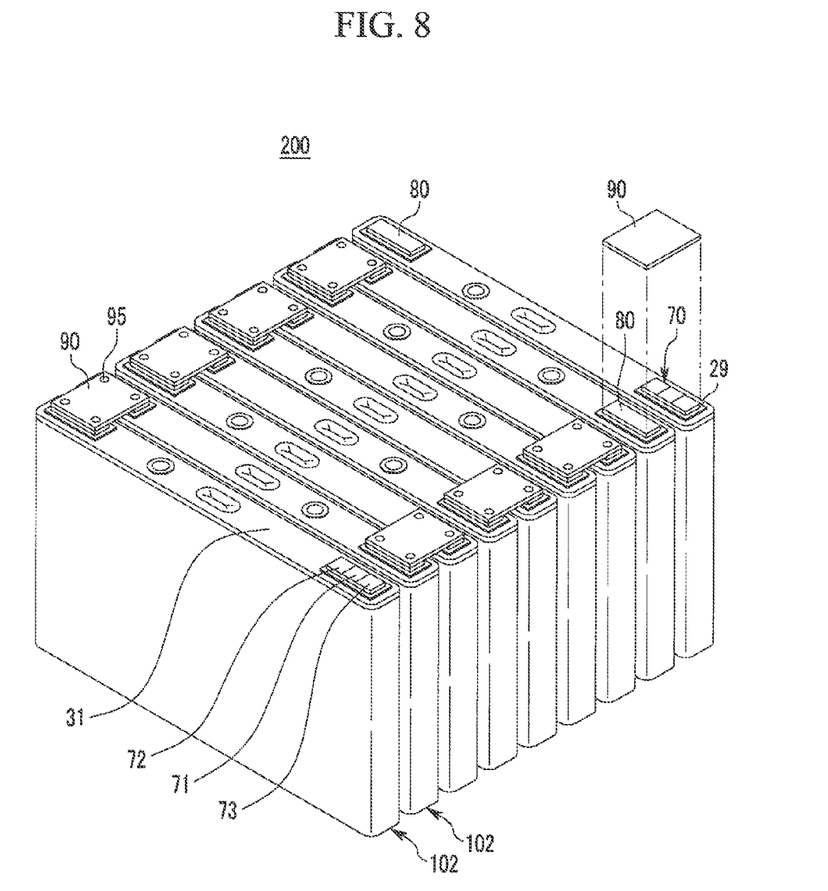
FIG. 8 is a perspective view of a battery module according to the second exemplary embodiment of the present invention.

FIG. 8 is a perspective view of a battery module according to the second exemplary embodiment of the present invention. Referring to FIG. 8, a battery module 200 according to the present exemplary embodiment includes a plurality of rechargeable batteries 102 and a connection member 90 electrically connecting the rechargeable batteries 102.

The plurality of rechargeable batteries 102 arranged in parallel are coupled in series by the connection member 90. Positive electrode terminal plates 70 and negative electrode terminal plates 80 of neighboring rechargeable batteries 102 are arranged in a crossed manner, and in this arrangement, the connection member 90 is bonded to a positive electrode terminal plate 70 of one rechargeable battery 102 and a negative electrode terminal plate 80 of the neighboring rechargeable battery 102 by welding.

The connection member 90 has a plate shape, and is bonded on the positive electrode terminal plate 70 and the negative electrode terminal plate 80 by welding to cover them, and terminal welding portions 95 bonded with the terminal plates 70 and 80 are formed in the connection member 90.

The connection member 90 is formed from the same material as the positive electrode terminal plate 70 and the material of the second and third plates 72 and 73. In one embodiment, The connection member 90, the negative electrode terminal plate 80, the second plate 72, and the third plate 73 are made of copper, and the connection member 90 is bonded to the second and third plates 72 and 73 by welding in the positive electrode terminal plate 70.

As described, according to the present exemplary embodiment, the positive electrode terminal plate 70 welded with the connection member 90 is formed of the same material as the connection member 90 so that contact resistance between the connection member 90 and the positive electrode terminal plate 70 can be minimized.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of symbols | |
|---|---|
| 101, 102: rechargeable battery | 100, 200: battery module |
| 10: electrode assembly | 11: positive electrode |
| 11a: positive electrode uncoated region | 12: negative electrode |
| 12a: negative uncoated region | 13: separator |
| | 21: case |
| 27: electrolyte solution inlet | 28: first gasket |
| 29: second gasket | 30: cap assembly |
| 31: cap plate | 32: positive electrode current collecting tab |
| 33: negative electrode current collecting tab | |
| 34, 36: positive electrode terminal post | |
| 34a, 35a, 36a, 37a: flange | 34b, 35b: support |
| 34c, 35c: protrusion | 35, 37: negative electrode terminal post |
| 38: sealing cap | 39: vent member |
| 39a: notch | 40, 70: positive electrode terminal plate |
| 50, 80: negative electrode terminal plate | 51, 71: first plate |
| 52, 72: second plate | 53, 73: third plate |
| 51a: hole | 57: metal flow |
| 60, 90: connection member | 65, 95: terminal welding portion |

What is claimed is:

1. A battery module comprising:
a plurality of rechargeable batteries each of the rechargeable batteries comprising:
an electrode assembly;
a case and a cap plate accommodating the electrode assembly;
a first terminal post electrically coupled to an electrode of the electrode assembly and consisting of a first metal composition;
a first terminal plate comprising a first plate coupled to the first terminal post and consisting of the first metal composition and a second plate and a third plate both coupled to the first plate, spaced from the first terminal post, and consisting of a second metal composition different from the first metal composition, wherein the first terminal post extends within an opening in the first plate in a direction away from the case;
a second terminal post electrically connected to another electrode of the electrode assembly and protruding from the case, and a second terminal plate welded to the second terminal post, wherein the second terminal post, the second terminal plate and the second plate comprise the same material; and
an insulating gasket between the cap plate and the first terminal plate, wherein the insulating gasket directly contacts the first plate and the second plate; and
a connection member electrically coupling adjacent ones of the rechargeable batteries together, wherein the connection member is welded to the second plate and the third plate of a first one of the batteries and to the second terminal plate of a second one of the batteries and wherein the connection member consists of the second metal composition.

2. The battery module of claim 1, wherein, for each of the secondary batteries, the first plate and the second plate are friction-welded to each other.

3. The battery module of claim 1, wherein, for each of the secondary batteries, the first plate has an opening through which the first terminal post protrudes and wherein the first terminal post comprises a support on the first terminal post such that the first terminal post has a larger diameter at the support.

4. The battery module of claim 3, wherein, for each of the secondary batteries, the support and the first plate are welded together.

5. The battery module of claim 1, wherein, for each of the secondary batteries, the third plate is friction-welded to a side of the first plate.

6. The battery module of claim 5, wherein, for each of the secondary batteries, the first terminal plate is electrically coupled to a negative electrode of the electrode assembly, wherein the first plate comprises copper, and wherein the second plate and the third plate comprise aluminum.

7. The battery module of claim 1, wherein, for each of the secondary batteries, a metal flow is at a region adjacent to a bonding interface of the first and second plates.

\* \* \* \* \*